(12) United States Patent
Dietl

(10) Patent No.: US 9,114,689 B2
(45) Date of Patent: Aug. 25, 2015

(54) SIDE PANEL OF A COVER ON A VEHICLE ROOF

(71) Applicant: WEBASTO SE, Stockdorf (DE)

(72) Inventor: Rudolf Dietl, München (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/402,456

(22) PCT Filed: May 2, 2013

(86) PCT No.: PCT/EP2013/059193
§ 371 (c)(1),
(2) Date: Nov. 20, 2014

(87) PCT Pub. No.: WO2013/174635
PCT Pub. Date: Nov. 28, 2013

(65) Prior Publication Data
US 2015/0130227 A1    May 14, 2015

(30) Foreign Application Priority Data

May 24, 2012   (DE) .......................... 10 2012 010 148

(51) Int. Cl.
*B60J 7/22* (2006.01)
*B60J 7/00* (2006.01)
*B60J 7/047* (2006.01)

(52) U.S. Cl.
CPC ................ *B60J 7/0046* (2013.01); *B60J 7/047* (2013.01)

(58) Field of Classification Search
CPC .................................. B60J 7/22; B60J 7/0046

USPC ........................................................ 296/217
See application file for complete search history.

(56) References Cited

U.S. PATENT DOCUMENTS

| | | | |
|---|---|---|---|
| 7,850,230 B2 * | 12/2010 | Faerber ......................... | 296/217 |
| 7,878,581 B2 | 2/2011 | Faerber et al. | |
| 2010/0164253 A1 | 7/2010 | Faerber et al. | |

FOREIGN PATENT DOCUMENTS

| | | |
|---|---|---|
| DE | 10 2005 059274 A1 | 6/2007 |
| DE | 10 2006 002 064 A1 | 11/2007 |
| DE | 10 2008 006344 B3 | 4/2009 |
| DE | 10 2008 015669 B3 | 12/2009 |
| WO | 2007/076786 A1 | 7/2007 |

OTHER PUBLICATIONS

International Preliminary Report on Patentability [English translation] dated Nov. 27, 2014, issued against International Application PCT/EP2013/059193.
International Search Report dated Nov. 12, 2013, issued in International Application PCT/EP2013/059193.

* cited by examiner

*Primary Examiner* — Dennis H Pedder
(74) *Attorney, Agent, or Firm* — Fitch, Even, Tabin & Flannery LLP

(57) ABSTRACT

A side panel of a cover which can be folded out through a roof opening in a vehicle roof, said side panel being adjustable between a lowered starting position when the cover closes the roof opening and a raised covering position when the cover is folded out, wherein provision is made according to the invention that the side panel, in the lowered starting position thereof, is arranged below a boundary or contact region between a side edge of the cover and a roof part adjoining the roof opening and at a distance from the cover.

11 Claims, 15 Drawing Sheets

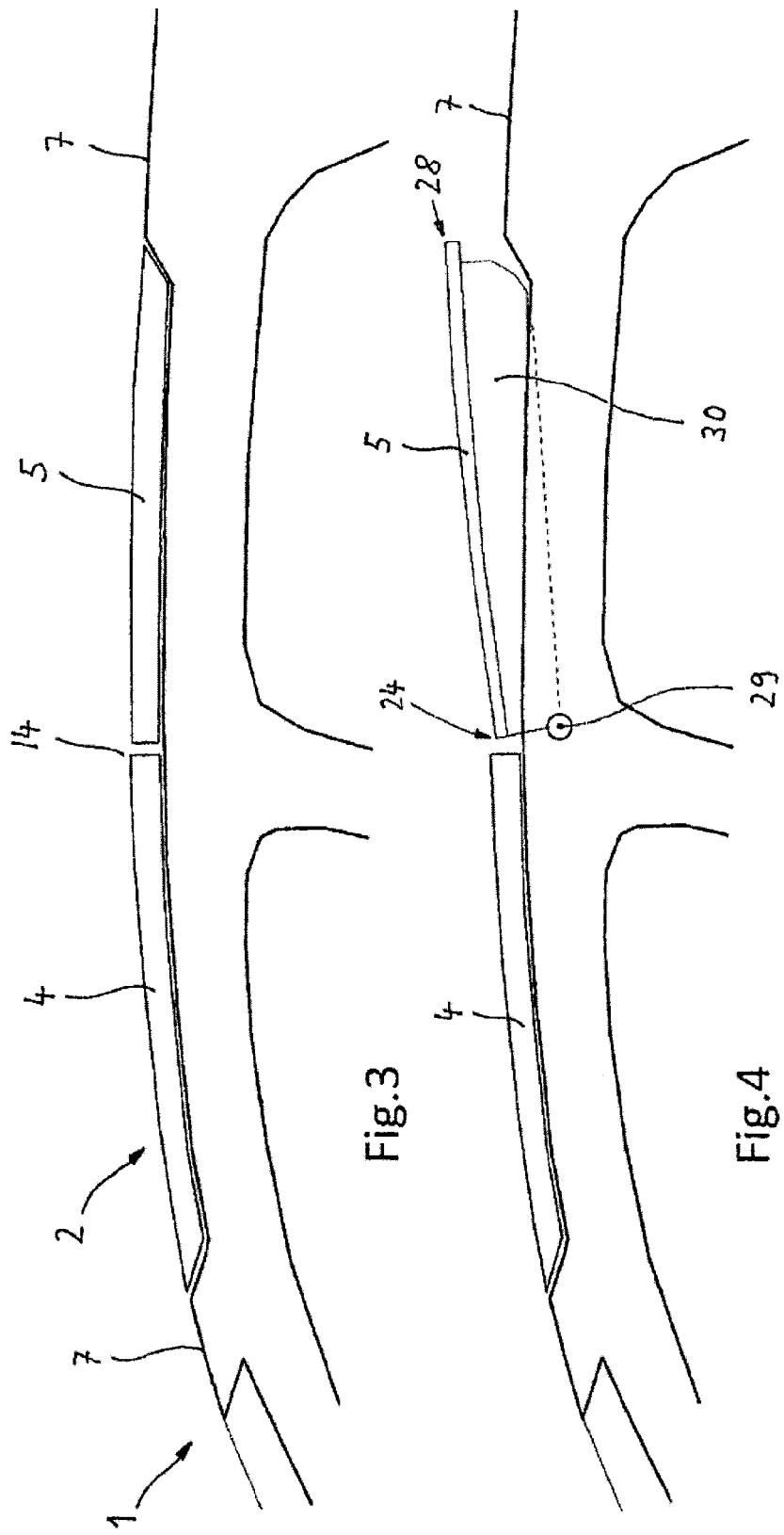

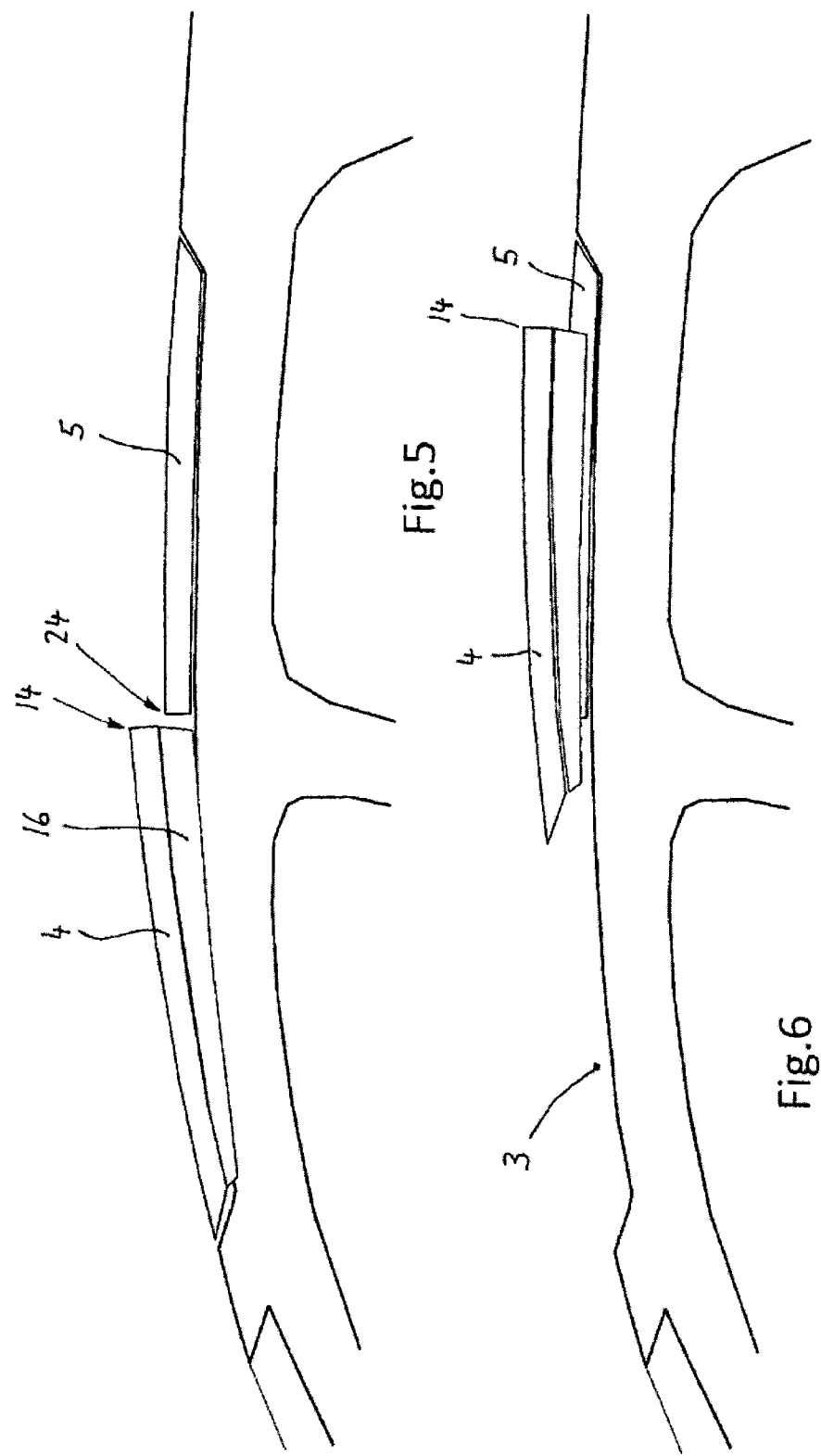

SIDE PANEL OF A COVER ON A VEHICLE ROOF

CROSS REFERENCE TO RELATED APPLICATIONS

This application is a U.S. national phase application filed under 35 U.S.C. §371 of International Application No. PCT/EP2013/059193, filed May 2, 2013, designating the United States, which claims priority from German Patent Application No. 10 2012 010 148.1, filed May 24, 2012, which are hereby incorporated herein by reference in their entirety for all purposes.

The invention relates to a side panel of a cover which can be folded out of a roof opening of a vehicle roof, said side panel being adjustable between a lowered starting position when the cover closes the roof opening and a raised covering position when the cover is folded out.

From DE 10 2008 015 669 B3 a side panel according to the preamble is known, which, when the cover of the vehicle roof to be opened is closed, is received in a panel chamber of a panel box under the side edge of the cover, and which can be swiveled around a swivel axle extending at its front end in the transverse direction of the roof vertically upward out of the panel chamber, when the cover is swiveled out over the vehicle roof. The adjustable side panel is always in contact with the cover and applied on the inside against at least one cover panel formed on the cover. A guide rail for the mounting of the cover is located with clear inward clearance from the lateral cover margin, and thus also inward from the side panel or the panel box which is located opposite from an arrangement of the guide rail beneath the side edge of the cover. However, this arrangement of the guide rail reduces the size of the roof opening in the transverse direction as well as the free view area through a transparent cover.

The invention is based on the problem of producing a side panel as mentioned initially, which is improved with regard to its installation position and functionality, and of providing a vehicle roof having such a side panel.

According to the invention, the problem is solved for the side panel mentioned initially in that the side panel in its lowered starting position is arranged beneath a boundary or contact region between a side edge of the cover and a roof portion delimiting the roof opening and at a distance from the cover.

The problem is also solved by an openable vehicle roof with a roof opening and a cover that can be raised from the roof opening and with a side panel according to one of claims 1 to 11.

Advantageous embodiments of the invention are indicated in the dependent claims.

The side panel according to the invention is accordingly arranged in its lowered starting position at a distance from the cover or from a side edge or lateral edge portion of the cover. Since said panel is arranged beneath a boundary or contact region between the cover and the laterally adjoining roof section of the vehicle roof, its positioning requires substantially no installation space beneath the cover or beneath the laterally adjoining roof section, so that these areas adjoining on the two sides remain free for other purposes, such as, for example, for other roof components, for drive and mounting devices or the like, or can be used for those purposes. Since the side panel is an independent component and thus not part of the cover, and since it is also advantageously not directly coupled to the cover, the adjustment of the side panel between its lowered starting position and its raised covering position can in principle be selected and adjusted independently, so that it can cover, in any adjustable manner, a side opening beneath the cover, when the cover is partially or entirely folded out. Accordingly, the side panel can completely replace a cover panel rigidly arranged on the cover, wherein, however, the side panel according to the invention can in principle also be provided additionally on a cover with a cover panel rigidly attached thereto.

The transitional region between the cover and the laterally adjoining roof section or roof portion is referred to as boundary or contact region, wherein the roof section can be a rigid roof cladding such as, for example, a metal roof sheet or a panel that can be attached to the vehicle roof or to a roof side member. The cover arranged in the closed position comes in contact with its side edge, which comprises, for example, a peripheral foam, with the laterally adjoining roof section or the roof portion, or it abuts against the roof section or the roof portion, for example, with formation of a small gap.

A cover for the closing and the at least partial uncovering of the roof opening is any roof element that can fulfill this function. Such a roof element is, for example, a transparent glass cover or plastic cover on which frame or mounting portions can be attached or formed.

Advantageously, a cover seal is arranged on the side edge of the cover and a roof seal is arranged on the roof portion, and, when the cover is closed, the two seals are in sealing contact with one another, so that the contact surfaces of the contacting seals form the boundary or contact region. The side panel is then adjustable so that, when the cover is swiveled out partially or else entirely, it is in sealing contact with at least one of the seals. In particular, in its raised covering position, the side panel can be in contact, on the one hand, with the cover seal and, on the other hand, with the roof seal. The side panel forms an advantageous barrier from the optical as well as the flow standpoint, so that, as a result of the reduction of air vortices at the side edges of the folded out cover, an acoustic improvement is also achieved during driving operation.

Advantageously, the side panel according to the invention is adjustable in the vertical direction between its lowered starting position and its raised covering position by means of an adjustment device. The adjustment in the vertical direction relates to a conventional substantially horizontal arrangement of a cover in a roof opening of a vehicle roof. The axis and direction terms used herein, such as, for example, "front," "rear," "outer," "inner," "vertical," "horizontal" and "lateral" refer to a three-dimensional vehicle coordinate system. When the cover with which the side panel according to the invention is associated is arranged in a slanted roof surface of a vehicle roof, this means the vertical direction is the direction perpendicular to the surface of the cover or to the roof surface containing the roof opening. Moreover, a vertical orientation is understood to mean a substantially vertical orientation, which also includes a certain angular range around the vertical. To the extent allowed by the installation space beneath the boundary or contact region, the side panel can also be adjusted by a swivel motion or by an adjustment motion consisting of a combination of a linear motion and a swivel motion, instead of by a linear vertical motion.

The adjustment of the side panel can occur synchronously with the adjustment or swivel motion of the cover or with a time lag. In the case of synchronous motion, the side panel is advantageously coupled for that purpose to an adjustment or fold-out mechanism of the cover or to a drive device, or it can be coupled and uncoupled for a certain movement path. On the other hand, an independently controlled drive for the adjustment of the side panel can also be provided, which allows a synchronous adjustment and also an adjustment that is independent of the movement of the cover.

According to a particularly preferable embodiment example, the cover is a rear cover of the vehicle roof with two covers in particular, and a front cover of the vehicle roof can be shifted over the rear cover arranged in the closed position, wherein, in the case of a shifting of the front cover over the rear cover, a mounting device of the front cover or at least portions of this mounting device are moved along above the side panel arranged in the starting position. For example, at least one rear fold-out lever of the mounting device of the front cover moves with at least one section above the side panel.

In such a vehicle roof with two covers, it is advantageous for the mounting device of the front cover to be shiftably mounted on a guide rail that is rigidly attached to the roof. A portion of this mounting device, for example, the rear fold-out lever, which is mounted in a slide shiftably held on the guide rail, moves, at the time of the adjustment of the front cover, in longitudinal direction over the rear cover, on or along a movement path extending at least in some sections in an upper gap or a movement gap, which is located between the side panel arranged in the starting position or lowered and the rear cover or a side wall of the rear cover. The side edge of the cover can be a peripheral foam, a cover seal attached on the side edge, or in general any lateral cover portion that is arranged adjacently to the side panel but at a distance from the side panel. The rear fold-out lever of the front cover moves, in particular, between the cover seal and the roof seal and thus in the boundary or contact region between the two mutually contacting seals.

Advantageously, a lower clearance or movement gap between the lowered side panel and the guide rail is provided, and, in particular, beneath the lowered side panel. In this lower clearance or movement gap, a portion—for example, sliding elements and a linkage to a drive cable for the adjustment of the front cover—of the mounting device of the front cover, at the time of its adjustment, can move over the rear cover. In this way, a compact arrangement of the side panel and of the mounting device of the front cover on the guide rail can be achieved with high functionality.

The adjustment device for the side panel can comprise at least one guide unit including a guide track and a sliding element guided thereon. In principle, it is possible to use any adjustment or guide devices that, in particular, have a simple and compact structure and that can comprise slide and shift guides as well as swivel mounts. In this way, a guide or adjustment track or such a gate as well as an associated slide or guide element can be provided both on the side panel and also on an associated component. When two guide or adjustment tracks separated by a clearance are provided, it is possible to achieve, by means of different inclinations of these two guide or adjustment tracks, for example, a more pronounced folding out of the rear end of the side panel in comparison to its front end, when the associated sliding elements are moved, for example, linearly. The guide or adjustment tracks can extend linearly or also in a curve, in order to set a corresponding movement behavior of the side panel.

The adjustment device can be provided exclusively for the adjustment of the side panel. However, it is preferable to use a design according to which the adjustment device forms a mounting device of the side panel. As a result, it is possible to achieve both the mounting of the side panel as well as its adjustment using only one device.

Advantageously, the side panel itself comprises a vertical guide or a gate track for an adjustment motion in the vertical direction. The vertical guide ensures a positioning of the side panel in the longitudinal direction next to the side edge of the cover during the adjustment of the side panel, when this function is not already fulfilled by the adjustment device.

In a preferred design, the side panel is mounted on an actuation device of the cover or rear cover, in particular on an actuation bar of a fold-out mechanism of the cover or rear cover. The actuation device or the actuation bar provides the required movement by means of which the side panel can be adjusted. The actuation bar has sufficient strength and stiffness, and it can bridge a greater length without bracing or guidance, so that installation and movement space for other mounting parts remains, for example, beneath the actuation bar.

The actuation device or actuation bar is advantageously mounted in a manner so that it can be moved longitudinally, and at the time of its respective longitudinal movement, it raises or lowers the side panel.

The side panel according to the invention can be used in the case of an openable vehicle roof according to claim 12 which comprises at least one cover, wherein the explained advantages occur particularly in the case of a so-called panoramic roof with at least two covers arranged one after the other.

A cover for the closing and the at least partial uncovering of the roof opening is any roof element that can fulfill this function independently of its shape or design. Such a roof element is, for example, a transparent glass cover or plastic cover on which frame or mounting parts can be attached or formed.

Below, the invention is explained in further detail using an embodiment example of a side panel according to the invention in reference to the drawing.

FIG. 3 shows, in a side view in a diagrammatic representation, a vehicle roof with a closed covers;

FIG. 4 shows, in a side view according to FIG. 3 in a diagrammatic representation, the vehicle roof on which the rear cover is folded out and an associated side panel is swiveled up;

FIG. 5 shows, in a side view according to FIG. 3 in a diagrammatic representation, the vehicle roof on which the front cover is folded out;

FIG. 6 shows, in a side view according to FIG. 3 in a diagrammatic representation, the vehicle roof on which the front cover has been shifted rearward over the closed rear cover;

Figure 1:
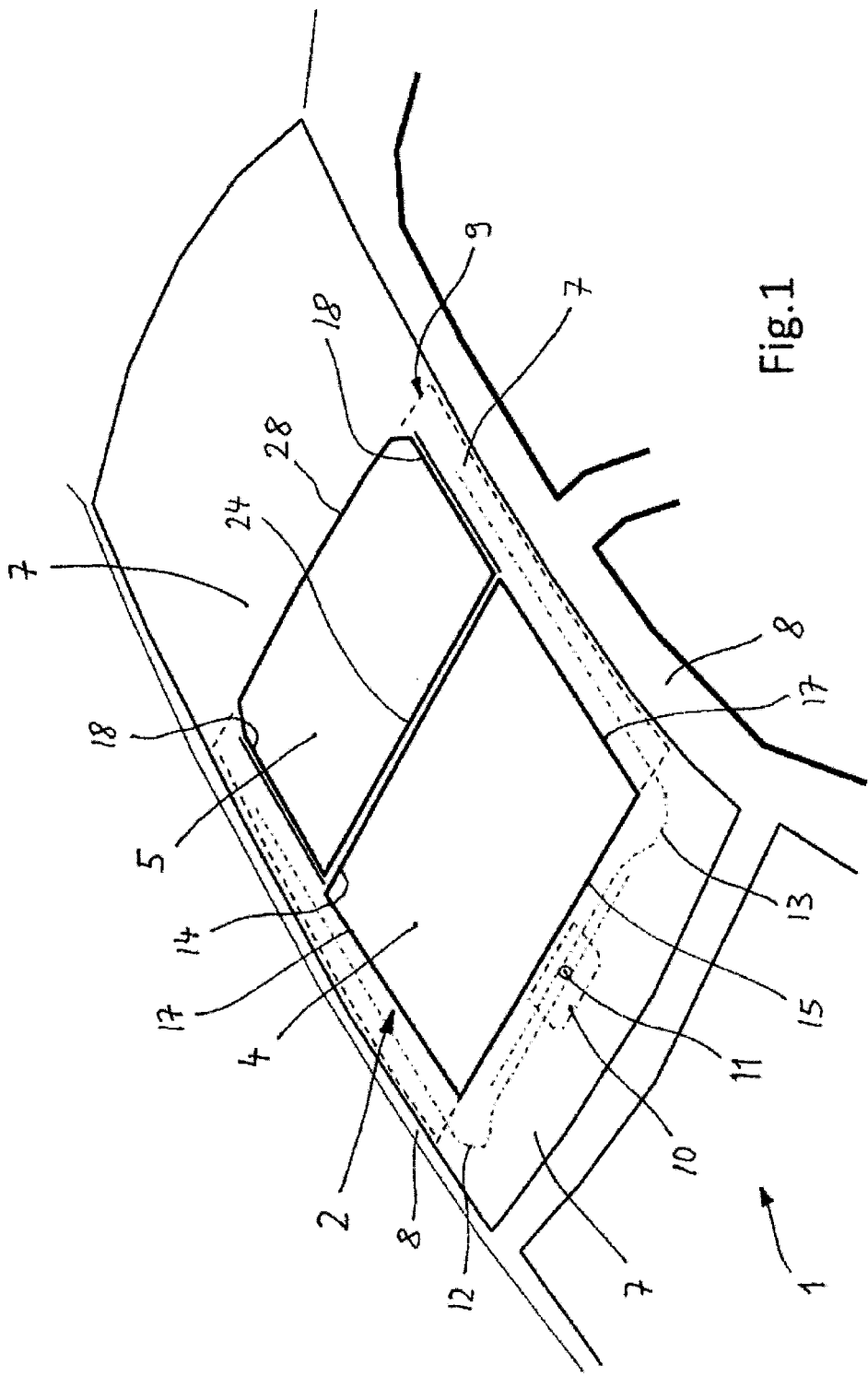
FIG. 1 shows, in a three-dimensional view, a vehicle with an openable vehicle roof and with a front cover and a rear cover which are arranged in a roof opening in the closed position.
Figure 10:
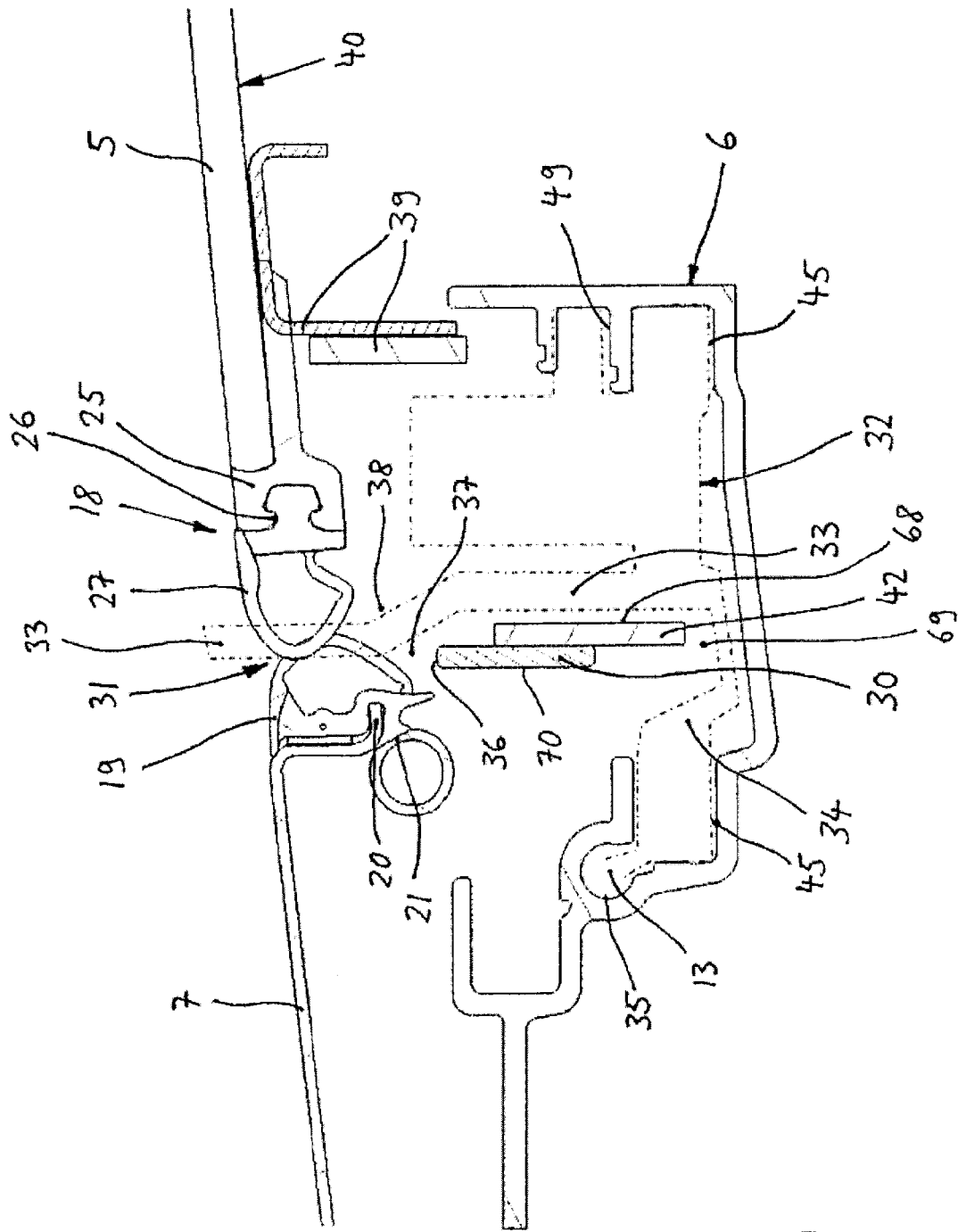
FIG. 10 shows, in a cross-sectional view, the vehicle roof at the left edge of the closed rear cover with a guide rail and the lowered side panel.

A motor vehicle or passenger car 1 contains an openable vehicle roof 2 with a roof opening 3 in which are arranged a front cover 4 and a rear cover 5 adjoining it rearward in the vehicle longitudinal direction. The two covers 4 and 5 are movably mounted on guide rails 6 arranged on the two sides of the roof opening 3 on the vehicle roof 2 (see FIG. 10). A rigid roof cladding 7 of the vehicle roof 2 surrounds the roof opening 3, wherein the lateral clearance between each of the two covers 4, 5 and lateral longitudinal roof members 8 can be covered by a panel 9 (see FIG. 10, represented with broken lines in FIG. 1) instead of the rigid roof cladding 7. The axis and direction designations used in the description, such as, for example, "front" "back," "outer," "inner," "vertical," "horizontal" and "lateral" refer to a three-dimensional vehicle coordinate system.

A drive device for the adjustment of the two covers 4, 5 comprises a drive motor 10, which is arranged, for example, centrally in front of the roof opening 3 beneath the rigid roof cladding 7 and which drives, in a known manner, via a drive wheel 11, two stretch resistant and compression-rigid drive cables 12 and 13 of the drive device, which are led to the right-side or left-side mounting devices of the two covers 4, 5. The drive motor 10 can also be arranged, for example, behind the rear cover 5 on the vehicle roof 2.

The front cover 4 can be raised by means of its mounting device from its closed position in the roof opening 3 (see FIG. 3) with its rear edge 14 and in the process it is swiveled around a transverse swivel axle arranged in the area of its front edge 15 out of the roof opening 3 into a ventilation position (FIG. 5). A cover panel 16 is rigidly arranged or formed on the two sides on each side edge 17 of the front cover 4 and it covers in the usual manner the otherwise open side region beneath the side edge 17 of the swiveled out front cover 4.

Figure 9:
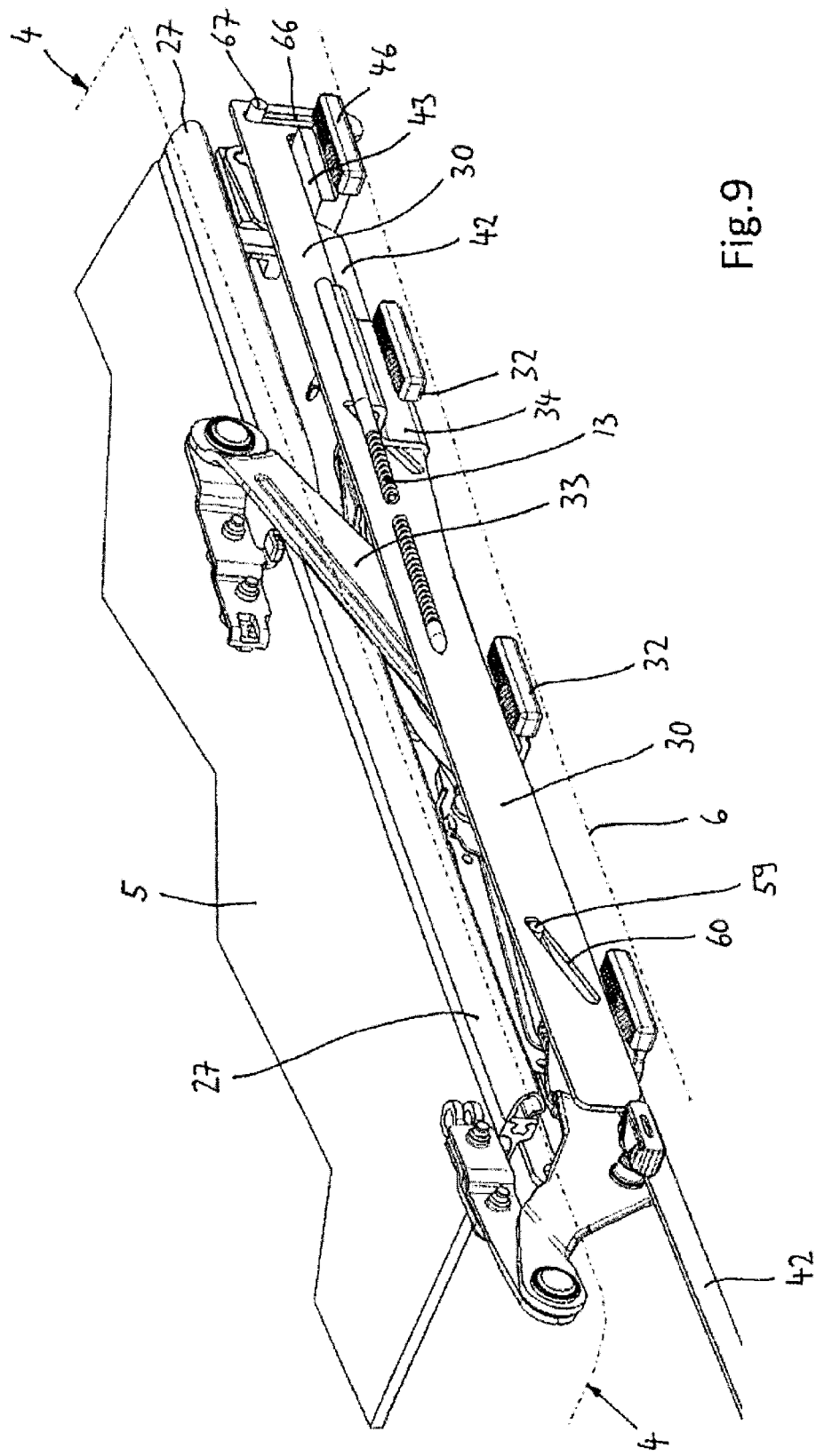
FIG. 9 shows, in a three-dimensional view at a slant from the front, the left side region of the rear cover with a mounting mechanism of the front cover shifted rearward over the rear cover.

The front cover 4 can be shifted from its swiveled out ventilation position according to FIG. 5 by means of a mounting device into a rearward open position over the rear cover 5 (see FIGS. 6 and 9), wherein the front cover 4 is raised to the required extent for this purpose. A mounting device for the front cover 4 is known, for example, from DE 10 2006 002 064 A1, to which reference is made for a more in-depth explanation of the mounting device, to the extent required for the understanding of the present invention.

Figure 2:
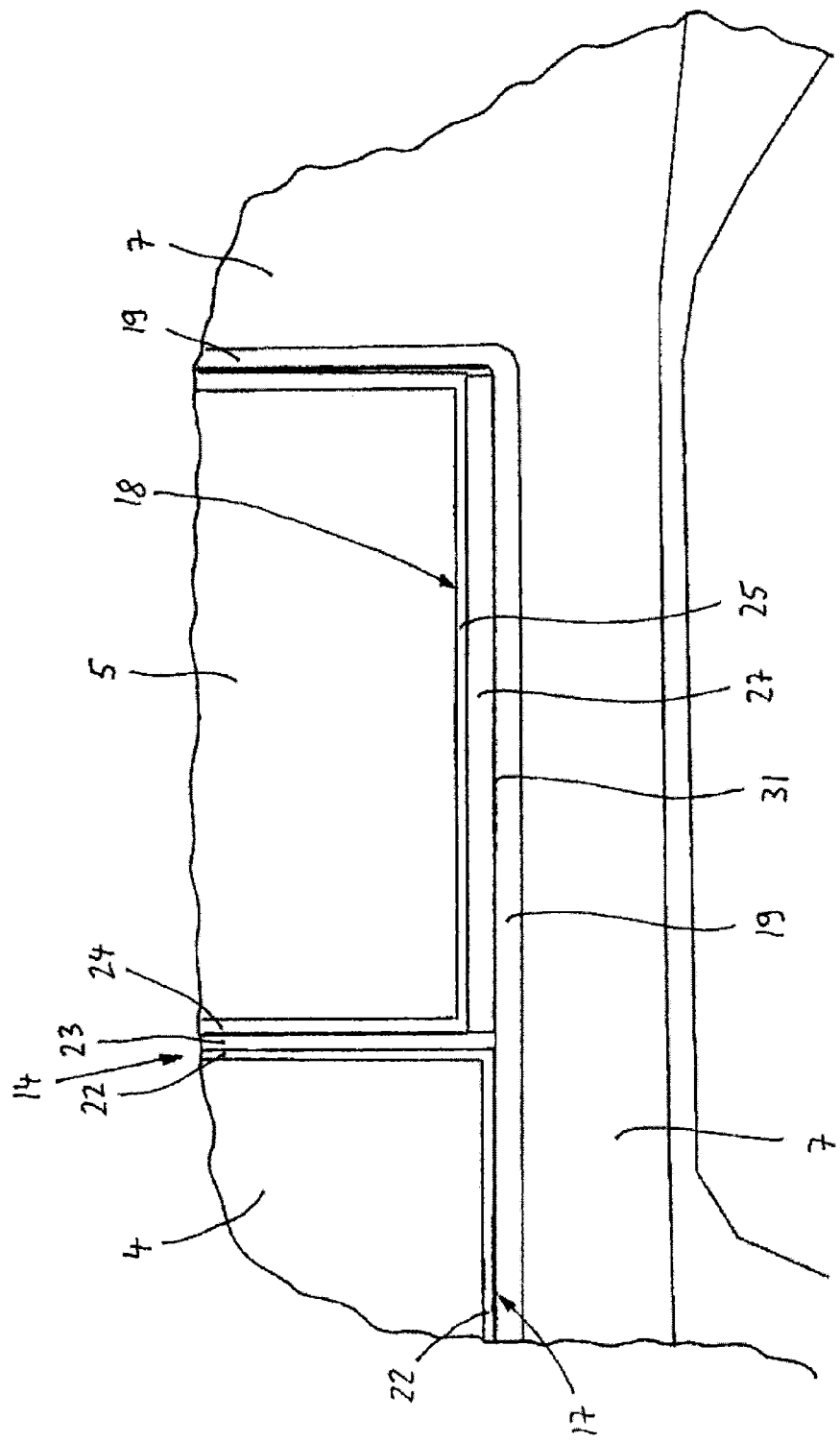
FIG. 2 shows, in a top view with cutaway representation, a left section of the roof vehicle with the covers closed.

The front cover 4 is broader than the rear cover 5 (see FIG. 2), so that the cover panel 16 of the front cover 4 is arranged laterally outside of the side edge 18 of the rear cover 5 when the front cover 4 moves over the rear cover 5. In the reversed movement course, the front cover 4 is moved back into its closed position in the front section of the roof opening 3.

A roof seal 19 surrounds the roof opening 3 peripherally and it is attached, for example, by adhesive bonding, on the roof side to the roof cladding 7 or to the panel 9 and/or it is stuck on a projection 20 of the roof cladding 7 or of the panel 9 in particular by means of an attachment piping 21 (see FIG. 10). The front cover 4, in its closed position, is in contact via a peripheral foam 22 with this roof seal 19, while it comprises, on its rear edge 14, a seal 23 for sealing contact with the front edge 24 of the rear cover 5. The rear cover 5 also comprises a peripheral foam 25, which is formed along its side edge 18 with a holder 26 for a lateral cover seal 27.

When the front cover 4 is closed or swiveled out, the rear cover 5 can be adjusted into a ventilation position (FIG. 4) in which it is swiveled out with its rear edge 28 around a swivel axle 29 arranged beneath its front edge 24, over the level of the roof cladding 7.

Figure 7:
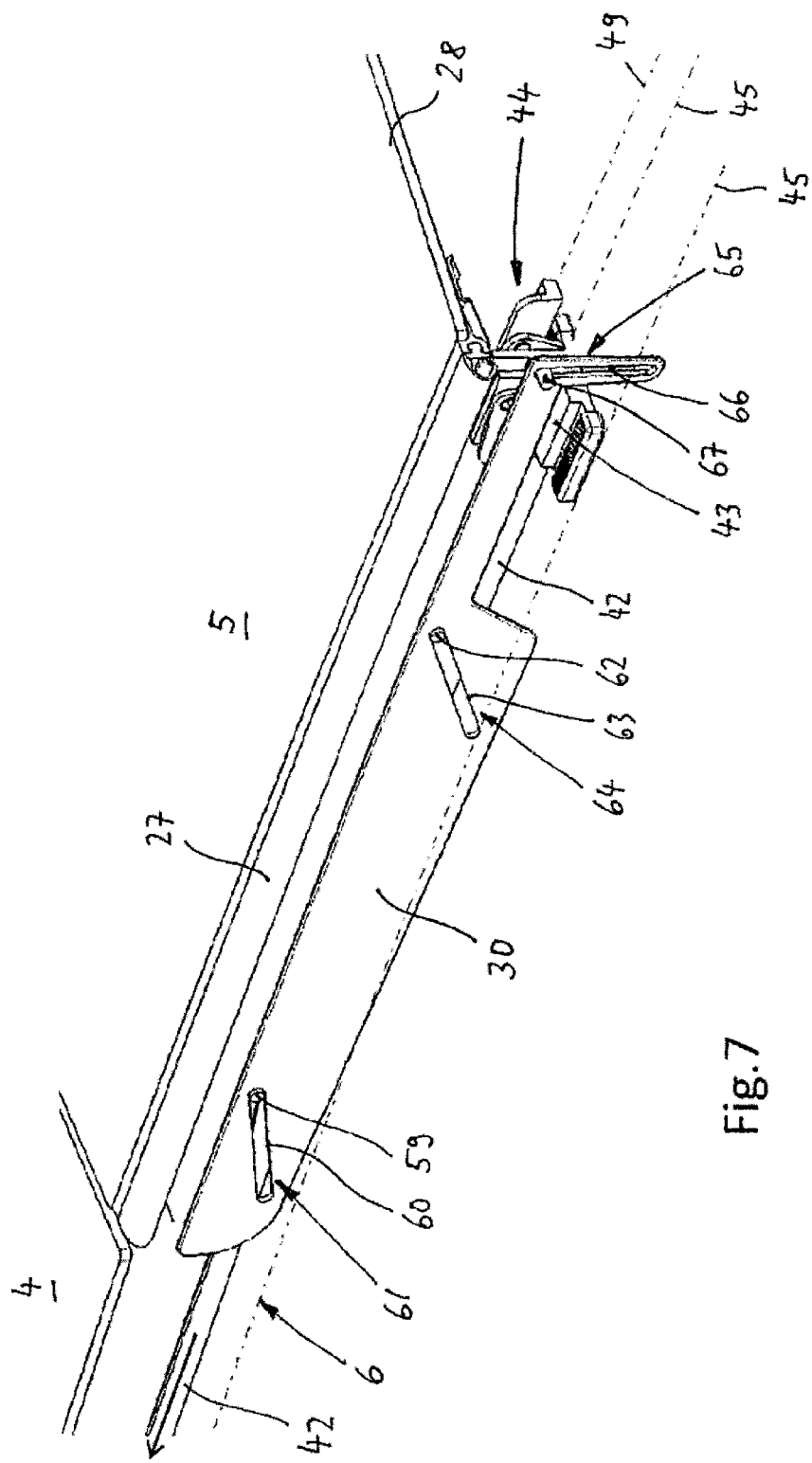
FIG. 7 shows, in a three-dimensional view, the left side region of the closed rear cover at a slant from the back with the side panel in the lowered starting position.

Associated with the rear cover 5, there is on the two sides in each case a side panel 30 (see, for example, FIGS. 7 to 10) which covers the open side region beneath the raised rear cover 5. The side panel 30 extends in the longitudinal direction substantially over the length of the side edge 18 of the rear cover 5, and, in its lowered rest or starting position (FIGS. 7 and 10), it is arranged beneath a boundary or contact region 31 between the cover seal 27 on the side edge 18 of the rear cover 5 and the roof seal 19 on the roof cladding 7 or panel 9 laterally delimiting the roof opening 3. This position of the side panel 30 is adapted to the mounting device of the front cover 4 in such a manner that at least one rear slide unit 32 with a rear fold-out lever 33 of the mounting device of the front cover 4 has sufficient movement space (see the representation of these components or of the movement space in chain-dotted lines in FIG. 10), when the front cover 4 is moved by means of its mounting device backward over the rear cover 5 (see the position according to FIG. 9). The rear slide unit 32 is shiftably mounted on the guide rail 6 and it is connected via an arm 34 to the drive cable 13 received in the cable channel 35 of the guide rail 6.

Thus, between an upper edge 36 of the side panel 30 arranged in this rest position and the boundary or contact region 31 of the two seals 19 and 27, a vertical clearance 37 remains, and between the upper edge 36 of the side panel 30 and the side edge 18 or the peripheral foam 25 of the rear cover 5, in the area of the attachment of the cover seal 27, a movement gap 38 remains for the rear fold-out lever 33 of the mounting device of the front cover 4. The laterally offset fold-out lever 33 moves, in the boundary or contact region 31, between the two seals 19 and 27 which, due to their resilient properties, are pushed apart by the fold-out lever 33 at the time of its movement.

Figure 14:
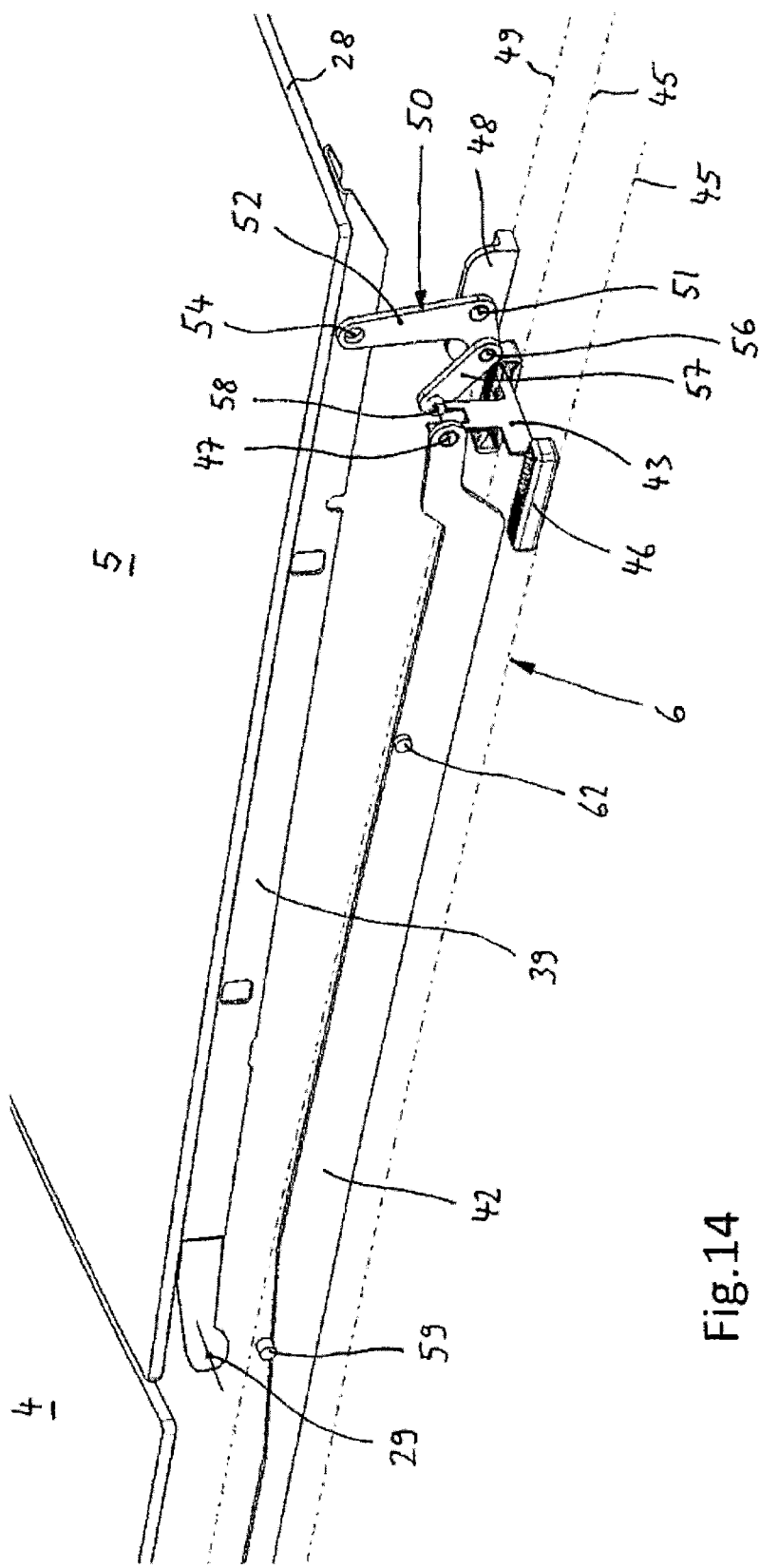
FIG. 14 shows, in a three-dimensional view according to FIG. 13, the rear cover adjusted by the fold-out mechanism into its completely folded out stroke position.

The rear cover 5 comprises, close to its respective side edge 18, a single- or multi-part cover carrier 39 (see in particular FIGS. 10 and 14), which is attached on the underside 40 of the rear cover 5, for example, by means of the peripheral foam 25, and which extends along the side edge 18 over approximately the entire length of the rear cover 5. The front swivel axle 29 is formed by a swivel bearing on the front section 41 of the cover carrier 39 approximately in an area beneath the front edge 24 of the rear cover 5. The swivel bearing is rigidly attached on the roof side to the vehicle roof 2 or to the guide rail 6 in a fixed position (not shown).

An actuation bar 42 extends along the guide rail 6 and the rear cover 5 rearward up to a drive carriage 43 of a fold-out mechanism 44 of the rear cover 5 the drive carriage 43 which forms a shiftable bearing support and the fold-out mechanism 44 is associated with the rear edge 28 of the rear cover 5. The drive carriage 43 is shiftably mounted on the guide tracks 45 of the lateral guide rail 6 by means of slides 46, and it can be shifted by means of the actuation bar 42 which is coupled, for example, by means of a connecting element 47 such as a bolt or a screw or the like, along the guide tracks 45 to the extent required for the adjustment of the rear roof portion 5. The actuation bar 42 can be coupled or is coupled on its front section to an actuation device (not shown), which applies a respective longitudinal control motion to the actuation bar 42 in order to actuate the fold-out mechanism 44 for folding out the rear cover 5. The actuation device comprises its own drive motor, or the actuation bar 42 can be coupled to or uncoupled from the respective drive cable 12, 13 by means of a locking block means.

The coupling and uncoupling by means of the locking block means can occur in such a manner that the actuation bar 42 is uncoupled from the drive cable 12 or 13 when the front cover 4 is shifted by the rearward moving drive cable 12 or 13 over the closed rear cover 5. In order to fold out the rear cover 5 by means of the fold-out mechanism 44, when the front cover 4 is closed, the actuation bar 42 is coupled to the forward moving drive cable 12 or 13 while the mounting device of the front cover 4 is uncoupled from the drive cable 12 or 13.

Figure 17:
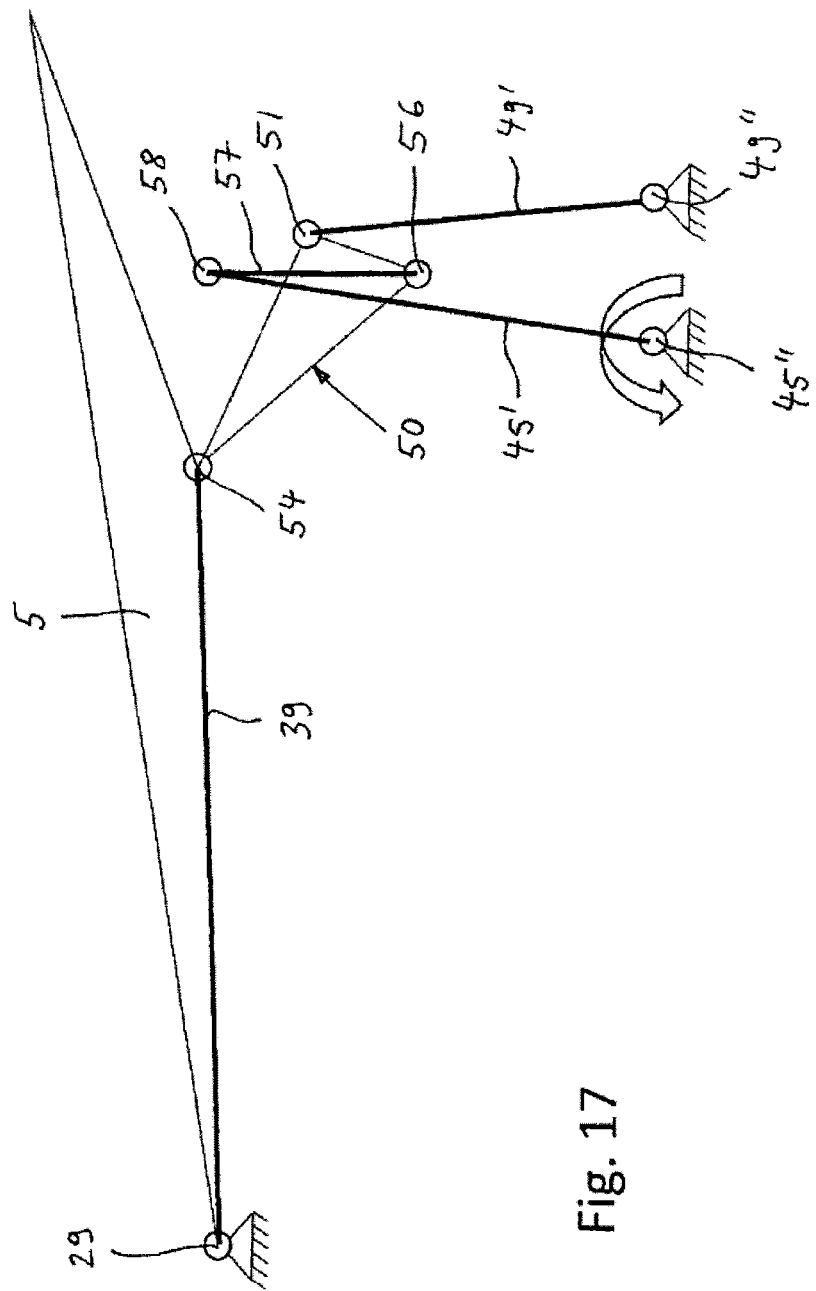
FIG. 17 shows, in a side view according to FIG. 15, the fold-out mechanism in the position when the cover is closed, as an explanation of the seven joint linkage.

The fold-out mechanism 44 of the rear cover 5 contains, in addition to the shiftable drive carriage 43, an additional fold-out slide 48 which is shiftably mounted on its own guide track 49 parallel to the guide track 45 of the drive carriage 43 and on which an intermediate connecting rod or fold-out lever 50 is swivelably mounted around a swivel axle 51. The fold-out lever 50, starting from its linkage or swivel axle 51 on the fold-out slide 48, is swivelably linked, on the one hand, via its longer limb 52 on the rear end section 53 of the cover carrier 39, by means of a swivel axle 54, and, on the other hand, on its shorter limb 55 in a swivel axle 56, it comprises a linkage of a toggle lever 57, which is linked on its other end to the drive carriage 43 in a swivel joint 58. The fold-out mechanism 44 thus in principle forms together with the front-side bearing or swivel axle 29 of the cover 5 a seven joint linkage in which, in accordance with the diagrammatic representation of FIG. 17, the guide track 45 for the drive carriage 43 is replaced by a connecting rod 45', which can be swiveled about a swivel axle 45" rigidly attached to the roof, and the guide track 49 for the fold-out slide 48 is replaced by a connecting rod 49', which can be swiveled about a swivel axle 49" rigidly attached to the roof, wherein these imaginary connecting rods 45' and 49' can have a length of any desired size and thus the movements of the swivel axes 58 and 51 approximate a shifting motion along the guides 45 and 49.

Figure 11:
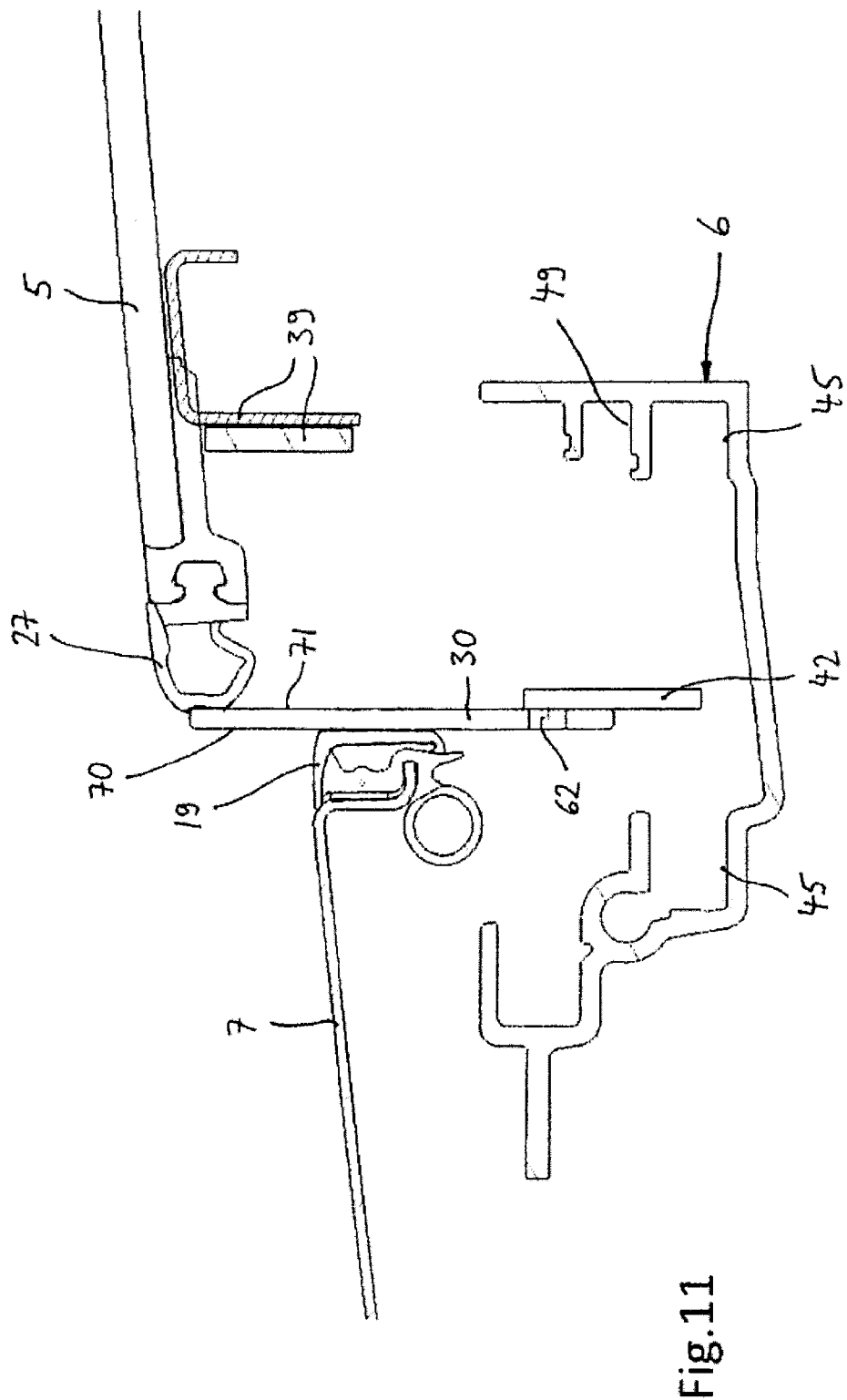
FIG. 11 shows, in a cross-sectional view according to FIG. 10, the folded out rear cover with side panel raised in the covering position.

An adjustment device for adjusting the side panel 30, which is arranged, in particular, on the outside next to or on the actuation bar 42, between its lowered rest or starting position (FIG. 10) and its raised covering position (FIG. 11), comprises a front adjustment element 59 and a front mounting unit 61 containing a front adjustment guide 60, and a rear mounting unit 64 containing a rear adjustment element 62 and a rear adjustment guide 63. The front adjustment guide 60 is arranged on the front section of the side panel 30 and the rear adjustment guide 63 is arranged on a rear section of the side panel 30. The two adjustment guides 60, 63 which are separated by clearance from one another, are formed, for example, as gates or slots extending in particular linearly and they comprise a section that rises from the front to the back, wherein the inclination of the front adjustment guide 60 is less than the inclination of the rear adjustment guide 63.

The front adjustment element 59 and the rear adjustment element 62 are arranged on the actuation bar 42 so that they point outwards and they are in sliding engagement on the front adjustment guide 60 or respectively the rear adjustment guide 63. The adjustment elements 59, 62 are, for example, pins or pegs or the like and they can have heads with enlarged diameter which hold the side panel 30 in contact with the outer side of the actuation bar 42.

The side panel 30 has, on its rear end 65, a vertical guide 66, on which a guide pin 67 is in sliding engagement. The vertical guide 66 is, for example, an elongate slot-shaped recess or slotted gate, and the guide pin 67 is rigidly attached on the roof side, for example, by means of a holding device on the guide rail 6.

Starting from the position of the two covers 4, 5 when the vehicle roof 2 is closed (see FIGS. 1 and 3), if the front cover 4 is shifted into its open position rearward over the closed rear cover 5 (FIGS. 6 and 9), the rear upward swiveled fold-out lever 33 of the mounting device of the raised front cover 4 moves between the roof seal 19 and the cover seal 27 of the rear cover 5 and rearward past the inner side 68 of the actuation bar 42 and the lowered cover panel 30. The lowered side panel 30 provides the required free space for the movement path of the mounting device 32, 33 of the front cover 4. Beneath the actuation bar 42 and also the side panel 30, a clearance 69 up to the guide rail 6 remains, in which the arm 34 of the rear slide unit 32 can move.

Figure 12:
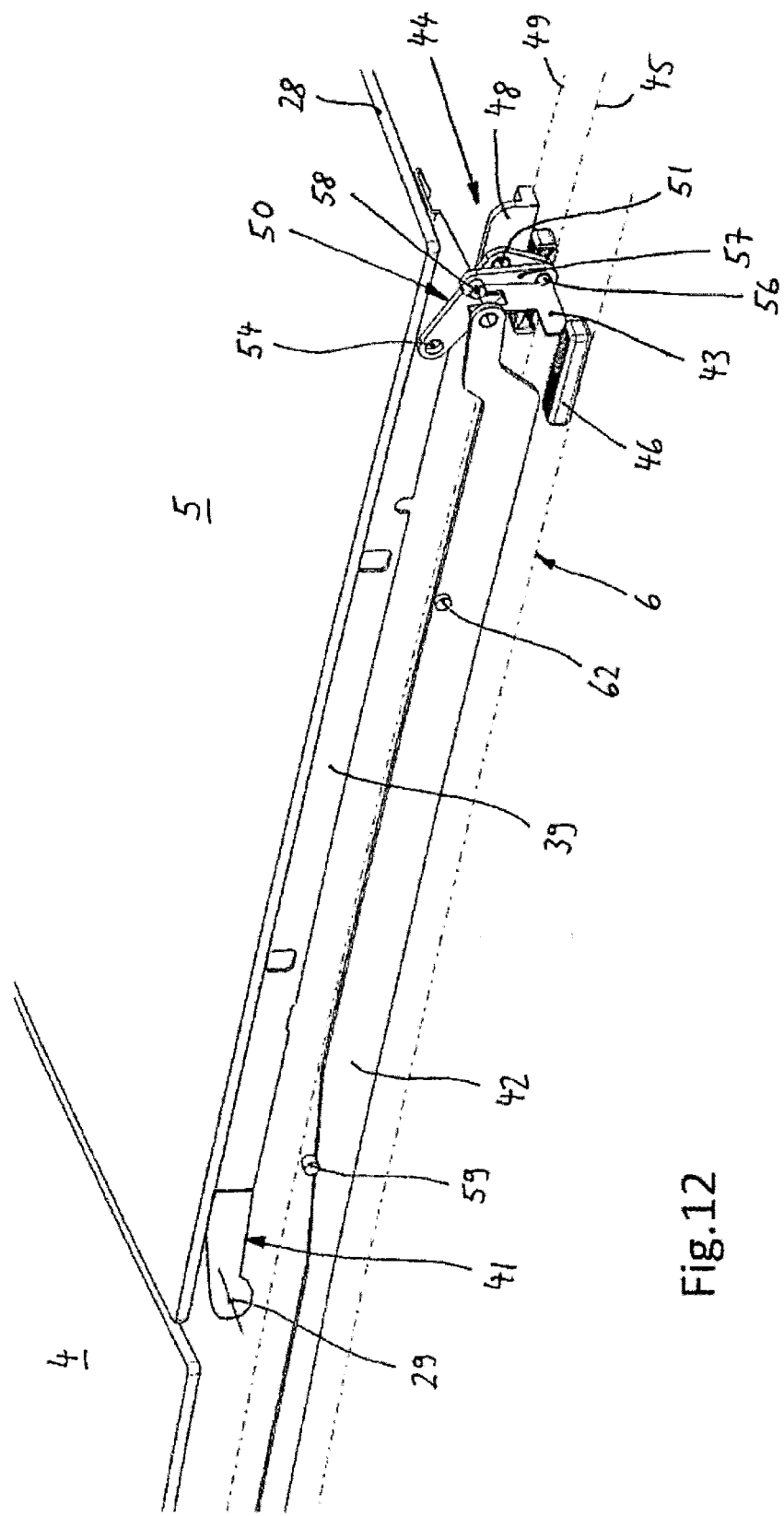
FIG. 12 shows, in a three-dimensional view similar to FIG. 7, the left side region of the closed rear cover with a fold-out mechanism at the rear corner region of the rear cover.
Figure 15:
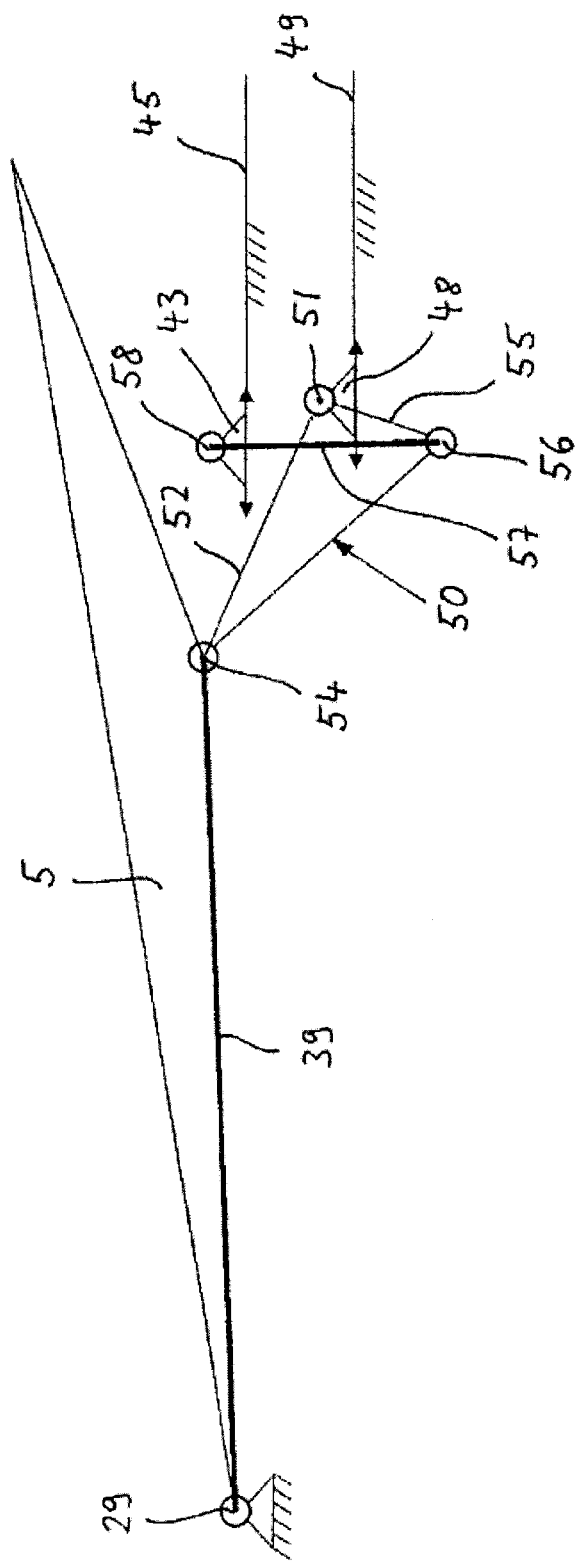
FIG. 15 shows, in a side view in a diagrammatic representation, the fold-out mechanism when the rear cover is closed.

The rear cover 5, in its closed position, is kept locked by the fold-out mechanism 44, whose toggle lever 57 is oriented approximately vertically and arranged at an angle of approximately 90° relative to the cover carrier 39 (see FIGS. 12 and 15). Since the drive carriage 43 to which the toggle lever 57 is linked is held in a fixed position by the actuation bar 42, a lifting force engaging on the rear cover 5 cannot swivel the rear cover 5 upward at its rear edge 28, since the fold-out lever 50 is blocked by the toggle lever 57 against swiveling.

Figure 13:
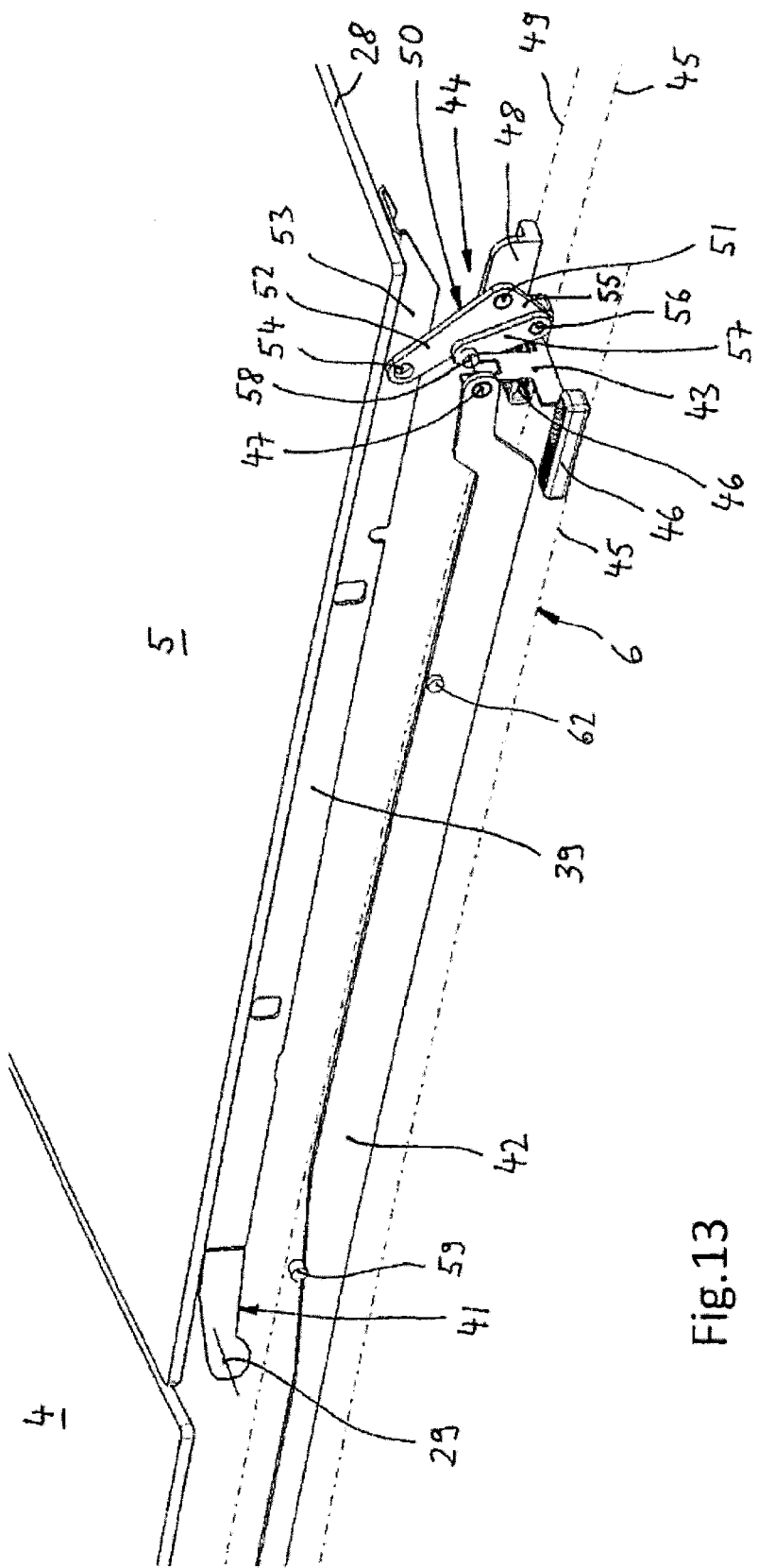
FIG. 13 shows, in a three-dimensional view according to FIG. 12, the rear cover raised by the fold-out mechanism into an intermediate position.
Figure 16:
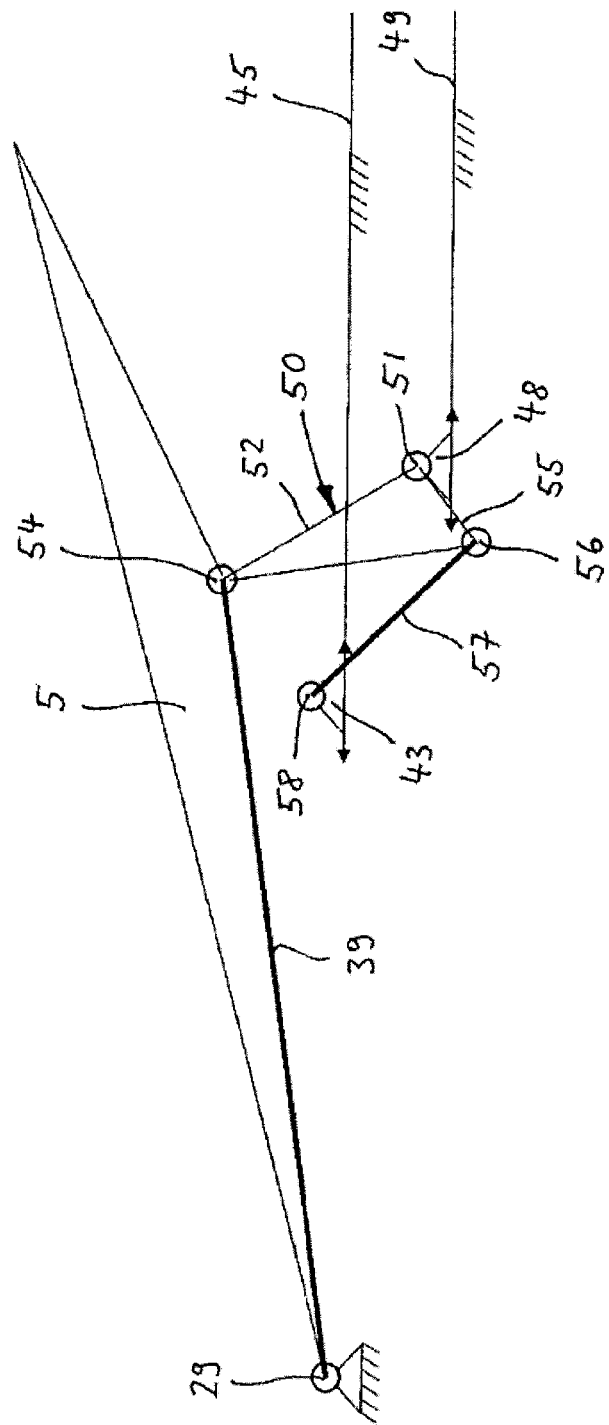
FIG. 16 shows, in a side view according to FIG. 15, the fold-out mechanism in an intermediate position when the rear cover is raised.

In order to fold out the rear cover 5, the drive carriage 43 is shifted forward by means of the actuation bar 42. An intermediate position of the fold-out mechanism 44, when the rear cover 5 is folded out is represented in FIG. 13, in which the drive carriage 43 shifts the toggle lever 57 forward at its upper swivel joint 58, and the toggle lever 57 swivels the fold-out lever 50 upward via the lower swivel axle 56, so that the rear cover 5 coupled via the swivel axle 54 is folded out. The fold-out slide 48 which provides a mount for the fold-out lever 50 adapts to the movement of the fold-out lever 50 as a result of a compensatory sliding movement along a guide track 45. FIG. 16 shows, in a diagrammatic representation, an intermediate position of the fold-out mechanism 44 just before the fully folded-out ventilation position of the cover 5.

During the forward directed movement of the actuation bar 42, the front adjustment element 59 and the rear adjustment element 62 slide in the associated adjustment guides 60 and 63 of the side panel 30 and they raise the side panel 30, panel which, as a result of the guide pin 67 guided in the rear vertical guide 66, is prevented from undergoing a shift in the longitudinal direction, and due to the different inclinations of the two adjustment guides 60 and 63, it is raised more strongly on the back than on the front.

A further movement of the actuation bar 42 shifts the drive carriage 43 into its front end position (see FIG. 15) in which the fold-out mechanism 44 has completely swiveled out the rear cover 5 into its ventilation position. The fold-out lever 50 is in a position with limb 52 arranged vertically or nearly vertically, so that forces introduced from the cover 5 onto the fold-out lever 50 are introduced over a short path into the fold-out slide 48 and supported by the latter on the guide track 49, and no or nearly no forces are transferred via the swivel axle 56 to the toggle lever 57. As a result, the fold-out mechanism 44 and the seven joint linkage are largely free of reverse acting forces, which can act in the direction of a shifting of the drive carriage 43, both when the rear cover 5 is closed and also when the rear cover 5 is completely folded out. When the cover 5 is closed, the fold-out mechanism prevents an undesired opening of the rear cover 5.

Figure 8:
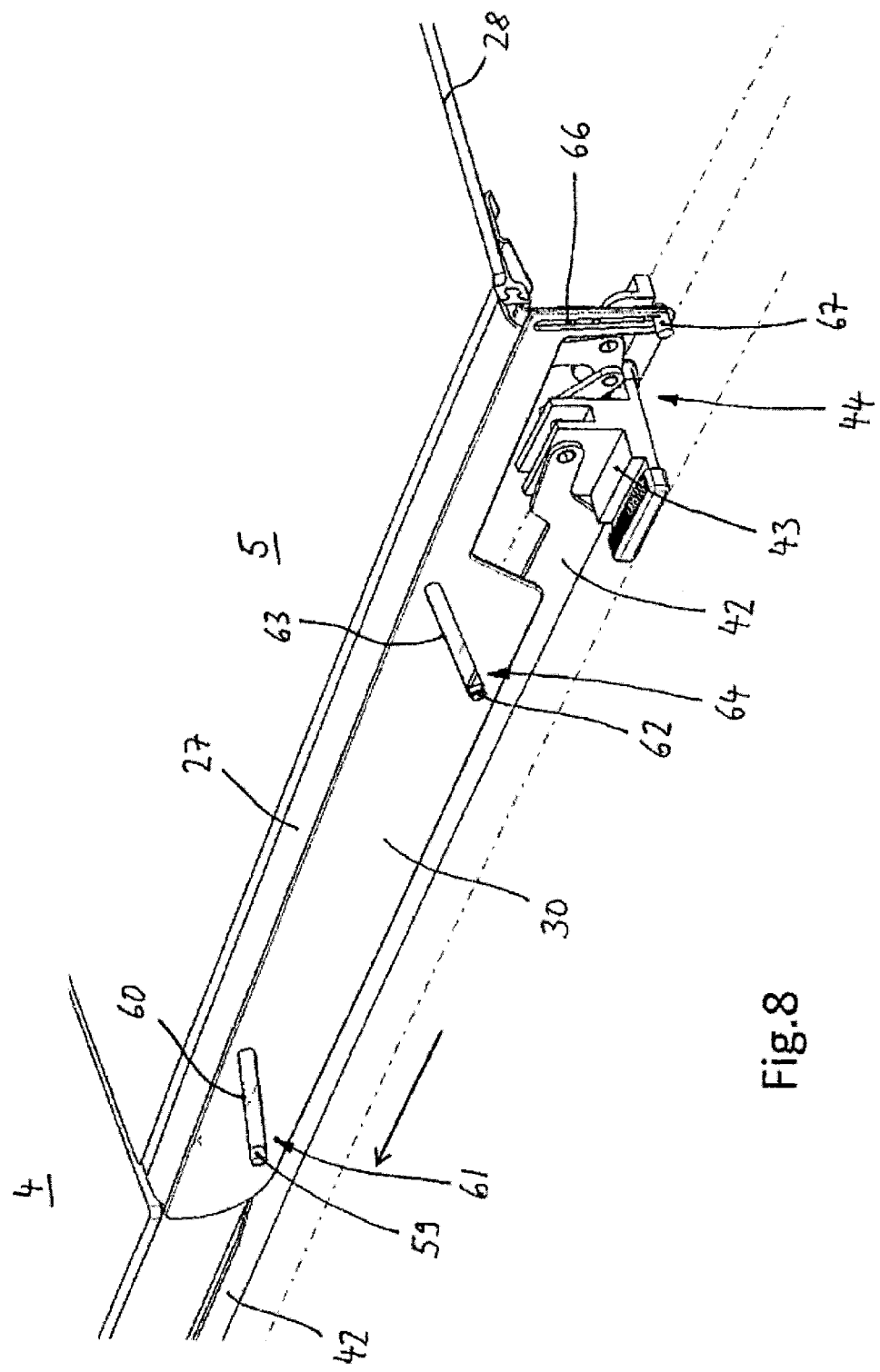
FIG. 8 shows, in a three-dimensional view according to FIG. 7, the left side region of the cover folded out at its rear edge and the raised side panel.

When the rear cover 5 moves into its completely swiveled out ventilation position, the side panel 30 is raised and swiveled by the actuation bar 42 into a covering position adapted to the position of the rear cover 5 (see FIG. 8). The cover panel 30 is here in tight contact (see FIG. 11) on its outer side 70 with the roof seal 19 and on its inner side 71 with the cover seal 27 and it forms a barrier from the optical as well as the flow standpoint.

Thus, the side panel 30 forms an effective barrier when the rear cover 5 is folded out, and due to its arrangement it allows the passing motion of the mounting device of the front cover 4 when the latter is adjusted backward over the rear cover 5.

The right and the left guide rails 6 in each case can be attached to the roof structure or to the roof side members of the vehicle roof, or they are parts of a frame arrangement which mounts the front cover 4 and the rear cover 5 and is attached to the vehicle roof. The at least one drive motor for adjusting the two covers 4 and 5 is attached on a front or on a rear transverse part of the frame arrangement. When a shading device is provided on the vehicle roof or on the frame arrangement, then its drive motor can also be mounted on a front or on a rear transverse part.

The individual features of the invention disclosed in the description and on the basis of the embodiment example as well as in the figures can be combined in any technically advantageous arrangements and designs with the subject matter of the invention in its general form.

The invention claimed is:

1. An openable vehicle roof with a cover, which can be folded out of a roof opening of the vehicle roof, and with a side panel which can be adjusted between a lowered starting position when the cover closes the roof opening and a raised covering position when the cover is folded out, wherein
   the side panel in its lowered starting position is arranged beneath a boundary or contact region between a side edge of the cover and a roof portion delimiting the roof opening and with a clearance from the cover.

2. Vehicle roof according to claim 1, wherein on the side edge of the cover, a cover seal is arranged, and on the roof portion a roof seal is arranged, and in that the side panel in its raised covering position abuts, on the one hand, against the cover seal and, on the other hand, against the roof seal.

3. Vehicle roof according to claim 1, wherein the side panel can be adjusted by means of an adjustment device in the vertical direction between its lowered starting position and its raised covering position.

4. Vehicle roof according to claim 1, wherein the cover is a rear cover of the vehicle roof and in that a front cover of the vehicle roof can be shifted over the rear cover arranged in the closed position, and when the front cover is shifted over the rear cover, a movement path of a portion of a mounting device of the front cover extends above the side panel arranged in the starting position.

5. Vehicle roof according to claim 4, wherein the mounting device of the front cover is shiftably mounted on a guide rail rigidly attached to the roof, and in that the movement path of a portion of this mounting device extends in an upper movement gap between the side panel arranged in the starting position and the rear cover.

6. Vehicle roof according to claim 4, wherein a lower clearance or movement gap is provided between the lowered side panel and the guide rail.

7. Vehicle roof according to claim 3, wherein the adjustment device comprises at least one guide unit including a guide track and an adjustment element guided thereon.

8. Vehicle roof according to claim 3, wherein the adjustment device forms a mounting device of the side panel.

9. Vehicle roof according to claim 1, wherein the side panel comprises a vertical guide for an adjustment motion in the vertical direction.

10. Vehicle roof according to claims 1 wherein the side panel is mounted on an actuation device of the cover.

11. Vehicle roof according to claim 10, wherein the actuation device is mounted so that it can be moved longitudinally, and the side panel is raised or lowered at the time of its respective longitudinal movement.

* * * * *